United States Patent
Graulich

(10) Patent No.: US 12,233,520 B2
(45) Date of Patent: Feb. 25, 2025

(54) BORE CLAMP

(71) Applicant: Ludwig Ehrhardt GmbH, Laubach (DE)

(72) Inventor: Oliver Graulich, Laubach (DE)

(73) Assignee: Ludwig Ehrhardt GmbH, Laubach (DE)

( * ) Notice: Subject to any disclaimer, the term of this patent is extended or adjusted under 35 U.S.C. 154(b) by 506 days.

(21) Appl. No.: 17/296,824

(22) PCT Filed: Jul. 8, 2020

(86) PCT No.: PCT/EP2020/069250
§ 371 (c)(1),
(2) Date: May 25, 2021

(87) PCT Pub. No.: WO2021/018532
PCT Pub. Date: Feb. 4, 2021

(65) Prior Publication Data
US 2022/0126421 A1    Apr. 28, 2022

(30) Foreign Application Priority Data
Jul. 29, 2019   (DE) .................... DE102019120427.5

(51) Int. Cl.
*B25B 5/08*    (2006.01)

(52) U.S. Cl.
CPC .................................. *B25B 5/087* (2013.01)

(58) Field of Classification Search
CPC ........ B23Q 3/06; B23Q 1/009; B23Q 1/0081; B25B 5/087; B25B 5/061
See application file for complete search history.

(56) References Cited

U.S. PATENT DOCUMENTS 3,792,855 A * 2/1974 Bondie .................. B23Q 3/103
279/74
3,829,078 A * 8/1974 Claycomb .............. B23Q 3/108
269/296
(Continued)

FOREIGN PATENT DOCUMENTS

DE       19917146 A1    10/2000
DE       10235577 A1     2/2004
(Continued)

OTHER PUBLICATIONS

English abstract of DE102008049753A1.
(Continued)

*Primary Examiner* — Seahee Hong
(74) *Attorney, Agent, or Firm* — Caesar Rivise, PC

(57) ABSTRACT

The invention relates to a bore clamp for clamping a workpiece having a workpiece bore located in the workpiece, with a radially expandable clamping bush, a displaceable clamping bolt for expanding the clamping bush in the clamping position, and with a clamping bolt drive for axial displacement of the clamping bolt into the clamping position. According to the invention, the clamping bolt drive includes a laterally displaceable piston and a wedge gear with wedge surfaces sliding on each other for converting the lateral movement of the piston into a corresponding axial movement of the clamping bolt in the clamping direction.

27 Claims, 11 Drawing Sheets

(56) References Cited

U.S. PATENT DOCUMENTS

| | | | | |
|---|---|---|---|---|
| 4,867,621 | A * | 9/1989 | Morghen | B23Q 3/108 409/218 |
| 4,909,493 | A * | 3/1990 | Yonezawa | B25B 5/087 269/309 |
| 6,095,509 | A * | 8/2000 | Yonezawa | B23Q 1/009 269/309 |
| 6,308,943 | B1 | 10/2001 | Fischer et al. | |
| 9,033,323 | B2 * | 5/2015 | Kawakami | B23Q 1/009 269/309 |
| 10,940,542 | B2 | 3/2021 | Graulich | |
| 2006/0049568 | A1 * | 3/2006 | Yonezawa | F16M 7/00 269/309 |
| 2006/0273504 | A1 * | 12/2006 | Yonezawa | B23Q 1/009 269/309 |
| 2009/0044386 | A1 * | 2/2009 | Matzat | B23Q 1/009 24/573.09 |
| 2011/0031670 | A1 * | 2/2011 | Kawakami | B23Q 1/009 269/48.1 |
| 2012/0319340 | A1 * | 12/2012 | Kawakami | B23Q 1/009 269/48.3 |
| 2013/0249156 | A1 * | 9/2013 | Haruna | B23Q 3/06 269/48.1 |
| 2015/0165575 | A1 * | 6/2015 | Kaji | B23Q 1/009 269/25 |
| 2016/0288297 | A1 | 10/2016 | Yoshimura | |
| 2017/0136551 | A1 * | 5/2017 | Graulich | B23Q 3/06 |
| 2017/0291266 | A1 | 10/2017 | Haruna | |

FOREIGN PATENT DOCUMENTS

| | | |
|---|---|---|
| DE | 102008049753 A1 | 4/2010 |
| EP | 0925871 | 6/1999 |
| EP | 1046468 | 10/2000 |
| EP | 3330041 B1 | 12/2018 |
| JP | 2010105111 A | 5/2010 |
| JP | 2010240775 A | 10/2010 |
| WO | WO2015/139838 | 9/2015 |

OTHER PUBLICATIONS

English abstract of DE10235577A1.
English abstract of DE19917146A1.
English abstract of JP2010105111A.
English abstract of JP2010240775A.
International Search Report for corresponding PCT Application No. PCT/EP2020/069250 dated Oct. 26, 2020.

* cited by examiner

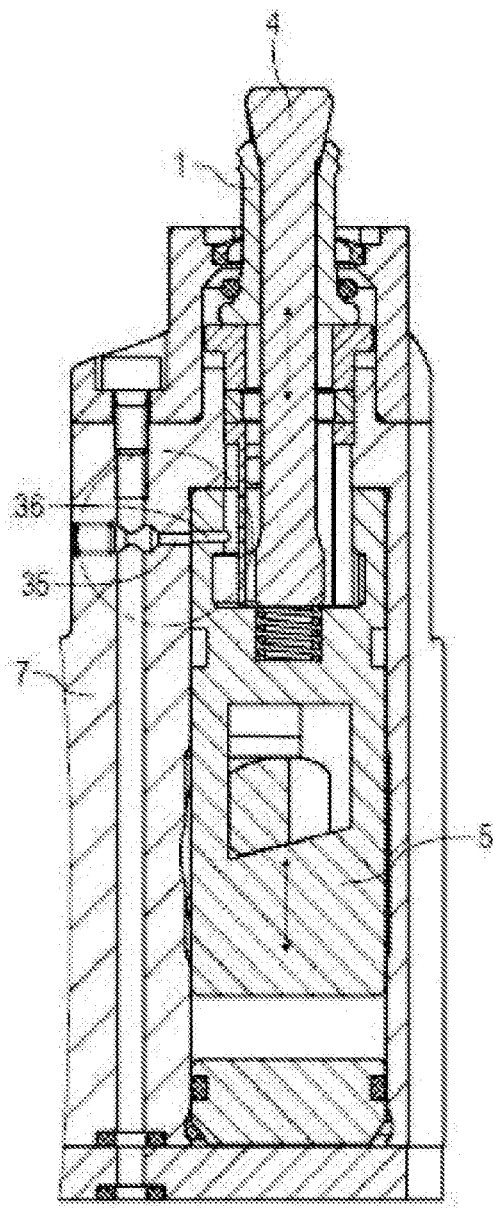
Fig. 5A
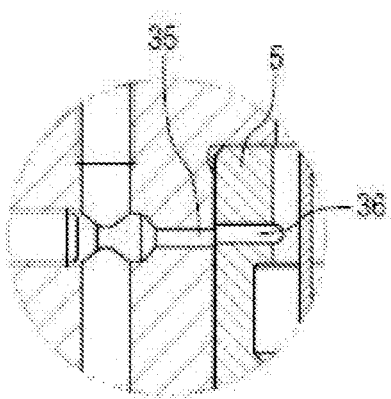
Fig. 5B  Unclamping position
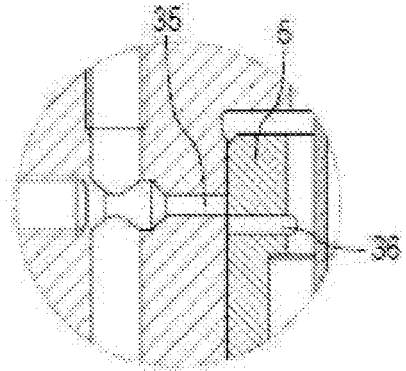
Fig. 5C  Start of tensioning range
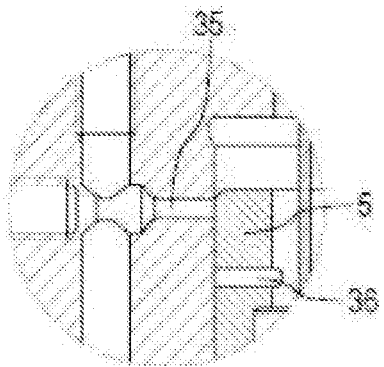
Fig. 5D  End of tensioning range
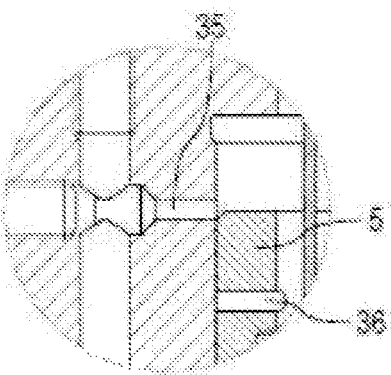
Fig. 5E  Fully clamped

BORE CLAMP

CROSS-REFERENCE TO RELATED APPLICATIONS

This application is a U.S. National Phase Application under 35 U.S.C. § 371 of PCT/EP2020/069250, filed Jul. 8, 2020, which claims priority to German Patent Application No. 102019120427.5, filed Jul. 29, 2019, the contents of which are incorporated herein by reference in their entirety.

BACKGROUND OF THE INVENTION

The invention relates to a bore clamp for clamping a workpiece.

Such a bore clamp is known, for example, from EP 3 330 041 B1. During a clamping process, a clamping bush of the bore clamp is inserted into a corresponding workpiece bore in the workpiece to be clamped and then expanded in the radial direction, whereby the clamping bush is anchored in the workpiece bore. The clamping bush is expanded by a displaceable clamping bolt which is arranged coaxially in the clamping bush and has a head which widens conically towards its free end. When the clamping bolt is retracted, the clamping bolt therefore expands the clamping bush in the radial direction, causing the clamping bush to be anchored in the workpiece bore. When the clamping bolt is further tightened, the workpiece is then pulled onto a workpiece support on the bore clamp and clamped. The clamping bolt is usually driven hydraulically by a piston which can be moved in the bore clamp parallel to the clamping direction. However, this known design of a bore clamp is not yet optimal with regard to the drive of the clamping bolt.

The invention is therefore based on the task of creating an improved bore clamp.

This object is solved by a bore clamp according to the claims.

BRIEF SUMMARY OF THE INVENTION.

The bore clamp according to the invention is suitable for clamping a workpiece comprising a workpiece bore located in the workpiece. The term "workpiece" used in the context of the invention is to be understood generally and is not limited to workpieces which are subsequently to be machined, for example in a milling machine. Rather, the term of a workpiece used in the context of the invention also includes other types of components.

In accordance with the known bore clamp described at the outset, the bore clamp according to the invention also comprises a clamping bush which can be expanded in the radial direction in order to anchor the clamping bush in a workpiece bore of the workpiece to be clamped. In a preferred embodiment of the invention, the clamping bush has several separate clamping segments which are arranged distributed over the circumference of the clamping bush, with separating slots between the individual clamping segments allowing radial expansion of the clamping segments.

In addition, the bore clamp according to the invention also has a clamping bolt which runs coaxially through the clamping bush and is axially displaceable in a clamping direction between a clamping position and an unclamping position. In the clamping position, the clamping bolt expands the clamping bush radially in order to anchor the clamping bush in the workpiece bore of the workpiece to be clamped. In the unclamping position, on the other hand, the clamping bush is not expanded in the radial direction so that the clamping bush can be inserted into the workpiece bore or pulled out of the workpiece bore in the unclamping position.

Furthermore, the bore clamp according to the invention also comprises a clamping bolt drive to move the clamping bolt in the clamping direction into the clamping position.

The bore clamp according to the invention is characterized by a special design of the clamping bolt drive. Thus, the clamping bolt drive according to the invention has a piston which can be displaced laterally with respect to the clamping direction. In the preferred embodiment of the invention, this piston can be displaced at right angles to the clamping direction, but other angular positions between the direction of movement of the piston on the one hand and the clamping direction on the other are also possible in principle. Furthermore, the clamping bolt drive according to the invention has a wedge gear with wedge surfaces sliding on each other in order to convert the lateral movement of the piston into a corresponding axial movement of the clamping bolt in the clamping direction. The wedge gear thus has a first wedge surface on the laterally displaceable piston and a second wedge surface acting on the clamping bolt. When the piston is displaced laterally, these two wedge surfaces slide on each other and thus lead to the desired movement of the clamping bolt.

In the preferred embodiment of the invention, the two wedge surfaces run plane-parallel to each other to enable effective force and direction conversion. It should be mentioned here that the wedge surfaces slide on each other in the clamping position, whereas in the unclamping position the wedge surfaces may be spaced apart and enclose a gap.

Furthermore, it should be mentioned that the wedge surfaces preferably include a certain wedge angle with the clamping direction, this wedge angle preferably being in the range of 10°-80°, 20°-70°, 30°-65° or 40°-55°, to name just a few examples.

Furthermore, it should be mentioned that the laterally displaceable piston can be driven by different types of drive. For example, the laterally displaceable piston can be driven electromotively, pneumatically, hydraulically or mechanically by means of a screw gear.

Furthermore, it should be noted that at least one of the wedge surfaces can be provided with a friction-reducing and/or wear-reducing coating. For example, a so-called DLC coating (DLC: diamond-like carbon) is suitable for this purpose.

Furthermore, within the scope of the invention, it is possible for the wedge surfaces of the wedge gear to be arranged in an oil bath in order to reduce friction and wear.

During a clamping process, the clamping bush is radially expanded, as already described above. In this radially expanded state, there is a risk that chips or other impurities will penetrate axially from above into the expanded clamping bush and thus, in extreme cases, lead to a malfunction. This problem is less serious if the clamping bush is inserted into a blind bore closed at the top on the workpiece to be clamped. However, it is also possible that the workpiece bore is not designed as a blind bore, but as a through bore that is open at the top. In this case, there is a particular risk of chips or impurities entering the expanded clamping bush from above through the through-hole in the clamped state. To solve this problem, in one embodiment a cover cap is provided on the free end of the clamping bolt, the cover cap preferably being detachably attached to the clamping bolt. The cover cap elastically closes the cross-section of the workpiece bore above the clamping bush, so that disturbing penetration of foreign bodies from the workpiece bore into the expanded clamping bush is prevented. For example, the cover cap can be made of rubber or some other elastic plastic material, which fits snugly against the inside wall of the workpiece bore in the shape of a plate. It should be mentioned here that the idea of a cover cap on the clamping bolt according to the invention is also of its own importance worthy of protection independently of the other features of the bore clamp. Therefore, the invention also comprises a clamping bolt with a cover cap attached thereto independently of other features of the bore clamp.

It has already been mentioned above that the wedge gear acts on the clamping bolt and presses it from the unclamping position into the clamping position during a clamping process. However, the wedge gear preferably does not act directly on the clamping bolt, but indirectly via a tension bolt, which is displaceable in a cylinder of the bore clamp along the clamping direction, whereby the clamping bolt is anchored in the tension bolt in the mounted state, so that a movement of the tension bolt from the unclamping position into the clamping position leads to a corresponding and equally directed movement of the clamping bolt from the unclamping position into the clamping position.

The anchoring of the clamping bolt in the tension bolt can, for example, be carried out in a detachable manner by means of a bayonet lock, which allows easy disassembly.

Furthermore, it should be mentioned that the bore clamp according to the invention preferably has an anti-rotation device which prevents rotation of the clamping bolt relative to the tension bolt during operation. For example, the anti-rotation device may comprise a ring from which two opposing bars project axially, the two bars preventing a hammer-shaped head of the tension bolt from rotating.

In the preferred embodiment of the invention, the bore clamp also has a reset device for resetting the radial expansion of the clamping bush in the clamping position to a radially contracted position of the clamping bush. This reset device also has an independent protectable meaning independent of the other features of the bore clamp. The invention therefore also includes the reset device with the features described below independently of the other features of the bore clamp and, in particular, without the wedge gear.

In one variant of the invention, the return of the clamping bush from the radially expanded clamping position into the radially contracted unclamping position is effected by wedge surfaces which are identical to one another. For this purpose, there is an annular wedge surface on the outside of the underside of the clamping bush. Below this is a movable wedge ring, which also has an annular wedge surface on the upper side. Axial displacement of this wedge ring then leads to radial compression of the clamping bush due to the sliding wedge surfaces on the wedge ring on the one hand and on the clamping bush on the other. For displacement of the wedge ring along the clamping direction, axially running plungers can be provided here, which are displaced by the tension bolt or are even integrally formed on the tension bolt. When the tension bolt moves axially from the clamping position to the unclamping position, these plungers then press the wedge ring upwards into the bore clamp, thereby radially compressing the clamping bush.

In another variant of the invention, the reset device for the clamping bush has, in contrast, at least one spring (e.g. spiral spring) which presses on the clamping bush from the outside with a certain reset force. Preferably, the tensioning direction of the spring is radially aligned. Furthermore, it should be mentioned that the restoring force can be adjusted, for example, with an adjusting screw.

In still another variant of the invention, on the other hand, the restoring device has first grooves in the lateral surface of the clamping bolt, the first grooves running in the longitudinal direction and each having an undercut. Here, in the clamping bush, second grooves extend in the inner surface of the clamping bush, the second grooves extending in the longitudinal direction and each having an undercut. Furthermore, in this variant of the invention, the reset device has coupling elements which are anchored with one end in the first grooves and with the other end in the second grooves and slide therein, so that the coupling elements effect forced guidance of the clamping segments of the clamping bush. In the event of an axial relative movement between the clamping bolt on the one hand and the clamping bush on the other, the force guidance results in a corresponding radial movement of the clamping segments of the clamping bush.

In yet another possible variant of the invention, the reset device has another positive-locking connection between the clamping bush and the clamping bolt, which also effects forced guidance in the radial direction. For example, a T-slot can be provided in one component, in which a correspondingly adapted spring element engages in the other component to effect the forced guidance.

In the preferred embodiment of the invention, the bore clamp additionally comprises a pneumatic position sensing means, wherein the pneumatic position sensing means can preferably detect and distinguish at least two, three or four different positions of the bore clamp. For example, the pneumatic position sensing can distinguish the following positions:
  a clamping position in which the workpiece to be clamped is clamped,
  an unclamping position in which the clamping bush can be inserted into the workpiece bore and withdrawn from the workpiece bore,
  a position of the tension bolt or the clamping bolt within a clamping range which permits a clamping process,
  a fully clamped position in which the tension bolt is fully tensioned and is outside the permissible clamping range.

In the preferred embodiment of the invention, the pneumatic position sensing system first comprises the aforementioned tension bolt, which is displaceable in a cylinder along the tensioning direction. In addition, the pneumatic position sensing system comprises a first compressed air line which, starting from the workpiece side at a first opening, opens essentially axially into the cylinder in which the tension bolt is displaceable. In the unclamping position, the tension bolt then closes this first opening, which can be interrogated pneumatically. In the clamping position, on the other hand, the tension bolt releases the first opening, which can also be interrogated pneumatically.

In addition, the pneumatic position sensing can have a second compressed air line that opens substantially radially into the cylinder at a second opening location, in which the tension bolt can be displaced along the tensioning direction. In addition, the pneumatic position sensor in this design has a radial bore in the tension bolt which, depending on the axial position of the tension bolt, is more or less aligned over the second opening of the second compressed air line. In the unclamping position, the radial bore in the tension bolt is then exactly aligned with the second opening of the second compressed air line, which can be detected pneumatically. The second opening of the second compressed air line, on the other hand, is closed by the lateral surface of the tension bolt when the tension bolt is within a permissible tensioning range that allows tensioning operation. This can also be sensed pneumatically. The second opening of the second compressed air line, on the other hand, is released again by the tension bolt when the tension bolt is fully tensioned and is thus outside the permissible tensioning range. This state can also be interrogated pneumatically. As a result, three different operating states can be detected and distinguished by means of the second compressed air line, namely the unclamped position, operation within the permissible clamping range and a state outside the competent clamping range.

In addition or alternatively, the bore clamp may also have an electrical position sensing means to sense the position of the tension bolt. For example, an inductive sensor can be used for this purpose. In the preferred embodiment, the electrical position sensor can detect and distinguish between the clamping position, the unclamping position, a position of the tension bolt within the permissible clamping range and/or the clamped position of the tension bolt.

With the electrical position sensing of the tension bolt, the bore clamp can also calculate the diameter of the clamping bush, since the radial expansion of the clamping bush is determined by the axial position of the clamping bolt and thus also of the tension bolt.

Furthermore, the electrical position sensing also makes it possible to determine the penetration depth with which the clamping bush penetrates the inner wall of the workpiece bore in the radial direction. A clamping force sensor can be used here, which measures the clamping force acting on the tension bolt. This clamping force increases abruptly when the clamping bush abuts the inner wall of the workpiece bore as it expands radially from the inside. The bore clamp then determines the axial position of the tension bolt at the time of the sudden increase in the clamping force (i.e. at the contact between the clamping bush and the inner wall of the workpiece bore) and also the end position in the clamping position. The radial penetration depth of the clamping bush can then be calculated from the distance between these two axial positions. These calculations can be carried out by an evaluation unit, which can be integrated in the bore clamp and connected on the input side to the electrical position sensor and to the clamping force sensor.

A preferred design of the electrical position sensor is that the tension bolt has a slope on the side (e.g. a chamfer or a tapered surface) and a laterally arranged distance sensor, which is mounted laterally next to the tension bolt and measures the lateral distance to the slope (e.g. chamfer, tapered surface) of the tension bolt. This lateral distance between the distance sensor on the one hand and the slope of the tension bolt on the other is then a measure of the axial position of the tension bolt along the clamping direction.

Alternatively, the axial position of the tension bolt can also be determined via a distance sensor aligned parallel to the axial direction of the tension bolt, which measures the axial distance to one of the end faces of the tension bolt.

BRIEF DESCRIPTION OF THE DRAWINGS

Other advantageous further embodiments of the invention are indicated in the claims or are explained in more detail below together with the description of the preferred embodiments of the invention with reference to the figures. The figures show:

DETAILED DESCRIPTION OF PREFERRED EMBODIMENTS

Figure 1:
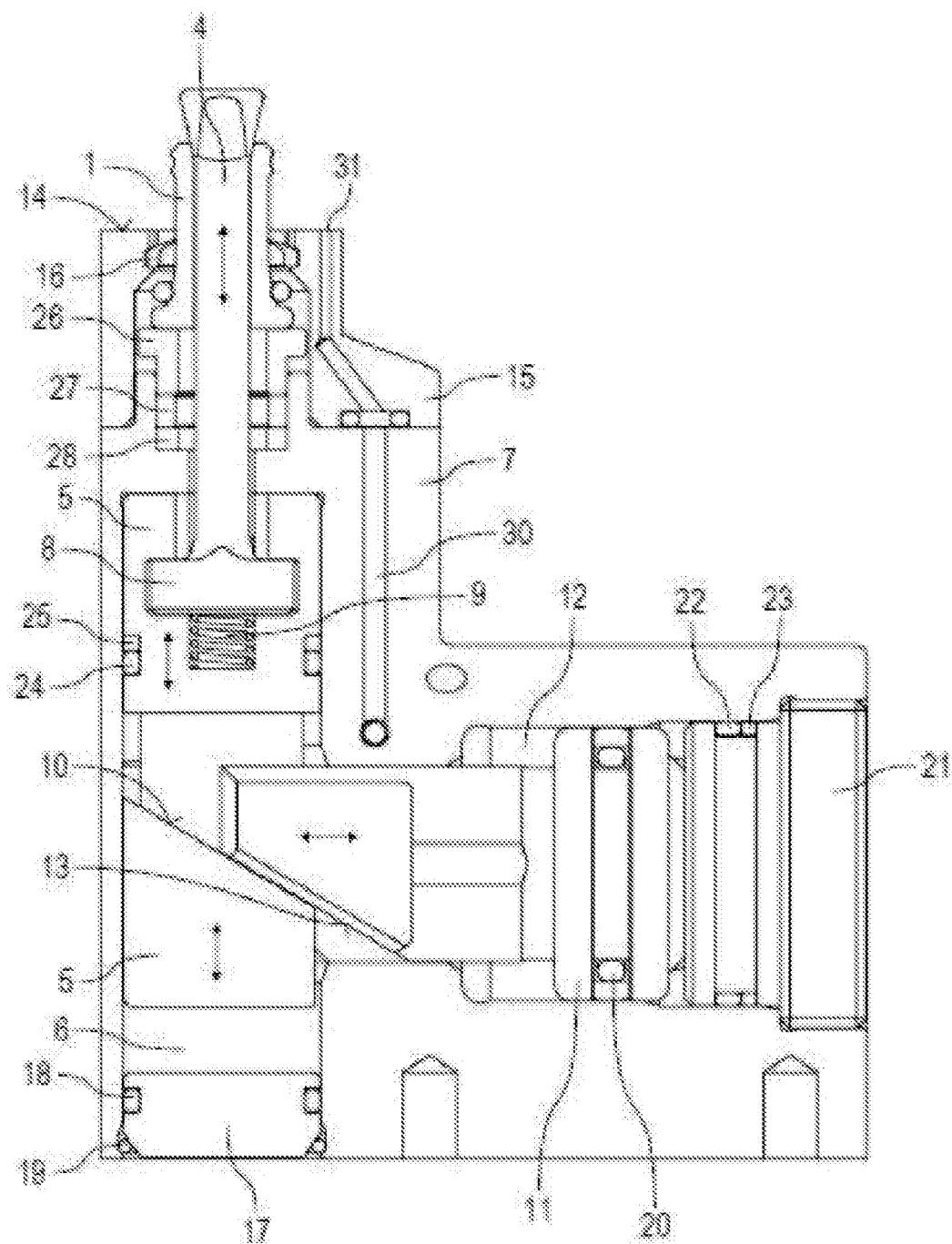
FIG. 1 a cross-sectional view through a bore clamp according to the invention.
Figure 2:
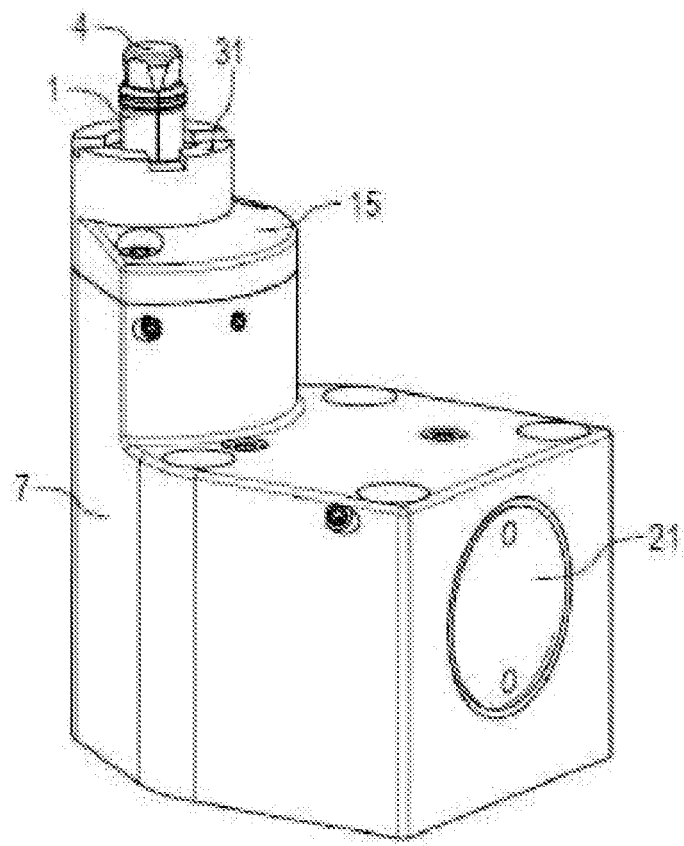
FIG. 2 a perspective view of the bore clamp of FIG. 1.
Figure 3:
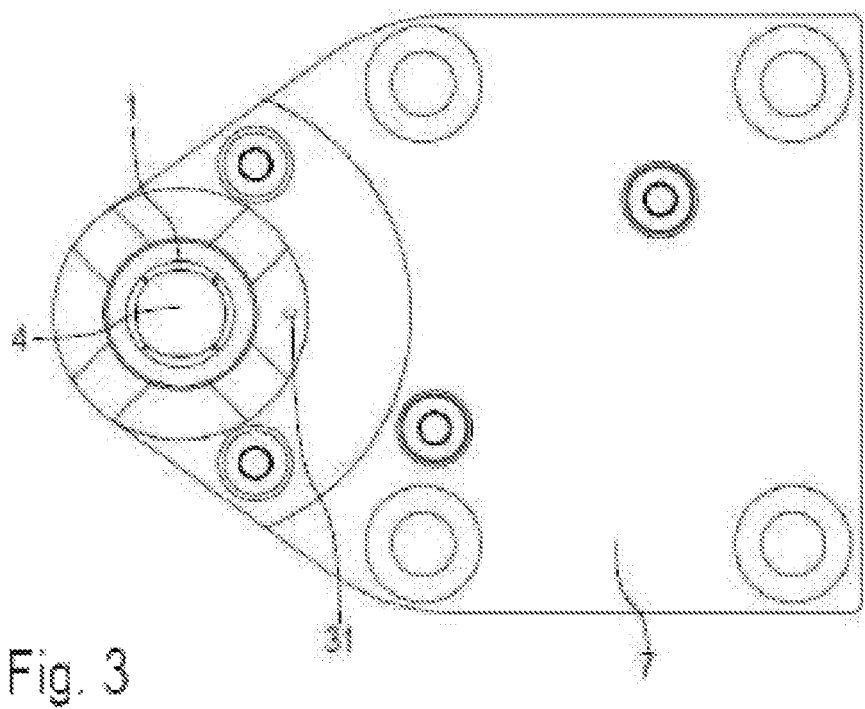
FIG. 3 a top view of the bore clamp according to FIGS. 1 and 2.

FIG. 1 shows a bore clamp according to the invention, which partly corresponds to conventional bore clamps as described, for example, in EP 3 330 041 B1.

Thus, the bore clamp according to the invention first of all has a clamping bush 1, the clamping bush 1 consisting of several clamping segments which are distributed over the circumference of the clamping bush 1 and are each separated from one another by slots. This makes it possible to expand the clamping bush 1 in the radial direction, as will be described in detail.

During a clamping process, the clamping bush 1 is inserted into a workpiece bore 2 (cf. FIG. 7B) in a workpiece 3 to be clamped. During this process, the clamping bush 1 is in the unclamping position, in which the individual clamping segments are radially contracted so that the clamping bush 1 can be inserted into the workpiece bore 2 or pulled out of the workpiece bore 2.

In addition, the illustrated bore clamp has, in a conventional manner, a clamping bolt 4 which extends coaxially in the clamping bush 1 and is displaceable in the direction of the double arrow along the clamping direction, as will be described in detail. At its free end, the clamping bolt 4 has a head which widens conically towards its end. When the clamping bolt 4 is moved in the proximal direction, i.e. downwards in the drawing, the conically widening head of the clamping bolt 4 causes the clamping bush 1 to widen radially. When the clamping bolt 4 is moved in the opposite direction in the distal direction, i.e. upwards in the drawing, the clamping bush 1 can, on the other hand, contract again in the radial direction.

The movement of the clamping bolt 4 in the clamping direction parallel to the double arrow is effected by a tension bolt 5, which is displaceable along the clamping direction in a cylinder 6 in a housing 7 of the bore clamp. The clamping bolt 4 is here anchored in the tension bolt 5 by means of a hammer-shaped head 8, whereby the clamping bolt 4 can be released from the tension bolt 5 by means of a bayonet lock. A compression spring 9 is located between the hammer-shaped head 8 and the tension bolt 5.

The tension bolt 5 is laterally open and has an inclined wedge surface 10 in this area for driving the tension bolt 5 and thus also the clamping bolt 4 by means of a wedge gear.

In addition, the wedge gear also comprises a piston 11 which is displaceable in a cylinder 12 in a lateral direction at right angles to the tensioning device. The piston 11 also has an inclined wedge surface 13 on its left-hand side in the drawing, the two wedge surfaces 10, 13 being aligned plane-parallel to one another and sliding on one another.

When the piston 11 moves from right to left in the drawing, the wedge gear thus leads to a downward movement of the tension bolt 5 and thus also of the clamping bolt 4.

On the other hand, when the piston 11 moves sideways from left to right in the drawing, the tension bolt 5 can be moved upwards again so that the tension bolt 5 and thus also the clamping bolt 4 can move from the clamping position to the unclamping position.

The wedge gear thus enables both force conversion and direction conversion. The directional conversion by the wedge gear is advantageous here because the different design shown in the drawing is made possible.

In the clamped state, the workpiece 3 is drawn onto a workpiece support 14, which is located on the upper side of a workpiece support bushing 15.

The clamping bush 1 is here surrounded annularly by a sealing ring 16, which is in itself known from the prior art.

On the underside of the bore clamp, the cylinder 6 is closed by a bushing 17, the bushing 17 being sealed by an O-ring 18 and fixed by a snap ring 19.

The piston 11 again includes a piston seal 20. Furthermore, it should be mentioned that the laterally aligned cylinder 12 for the piston 11 is closed by a threaded bushing 21, the threaded bushing 21 again being surrounded by an O-ring 22 and a support ring 23.

In addition, the tension bolt 5 is also surrounded by an O-ring 24 and a support ring 25.

Figure 6B:
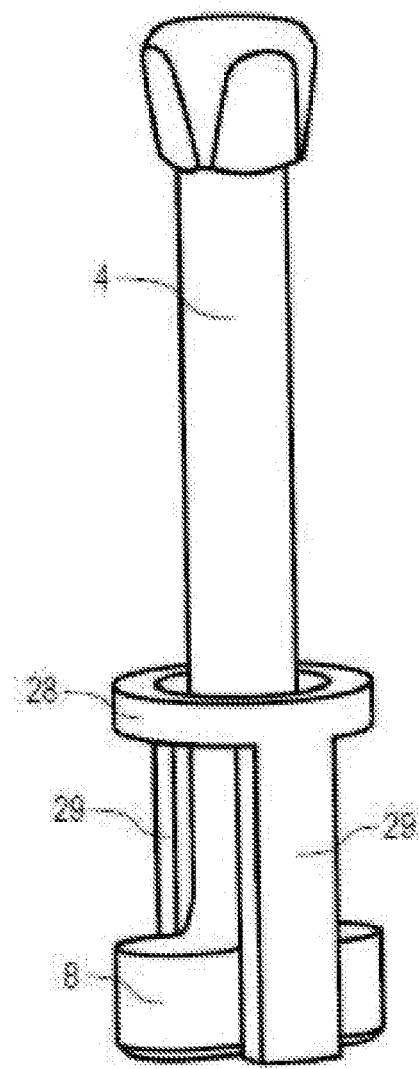
Figure 6A:
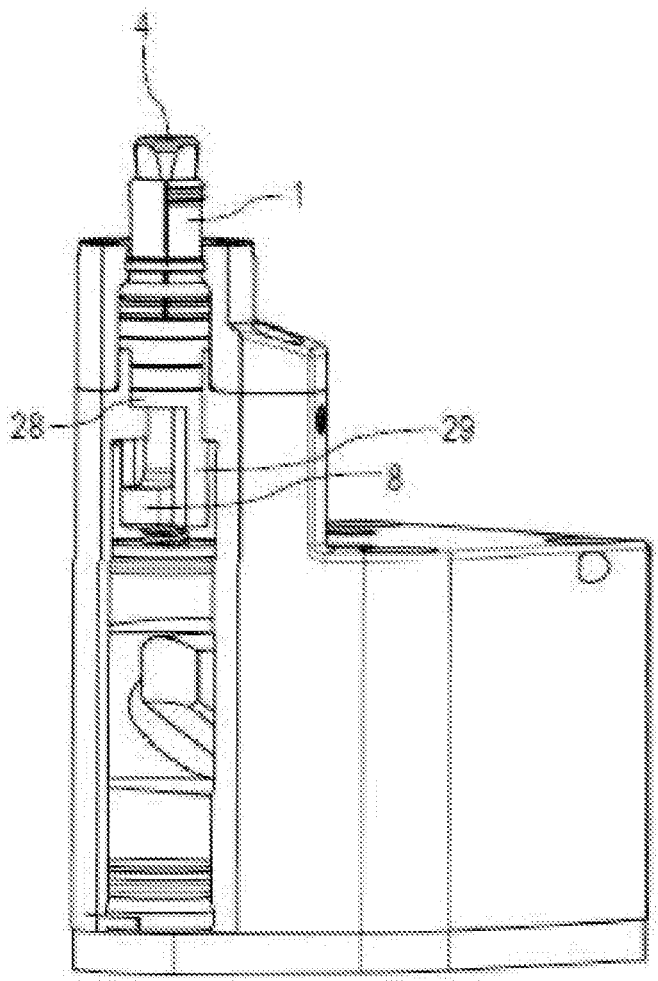

Furthermore, FIG. 1 shows a pull-down washer 26, a thrust ring 27 and an anti-rotation device 28, the anti-rotation device 28 being shown in FIGS. 6A and 6B. Thus, the anti-rotation device 28 essentially consists of a ring from which two bars 29 project axially, which prevent the hammer-shaped head 8 of the clamping bolt 4 from rotating, as can be seen in particular in FIG. 6B.

In addition, FIG. 1 shows a compressed air line 30 for pneumatic status monitoring, whereby the compressed air line 30 opens out in the workpiece support 14 at an opening 31. In the clamped state, the workpiece 3 to be clamped rests on the workpiece support 14 at the opening 31 and thereby closes the opening of the compressed air line 30, which enables pneumatic monitoring.

Figures 4A, 4B:
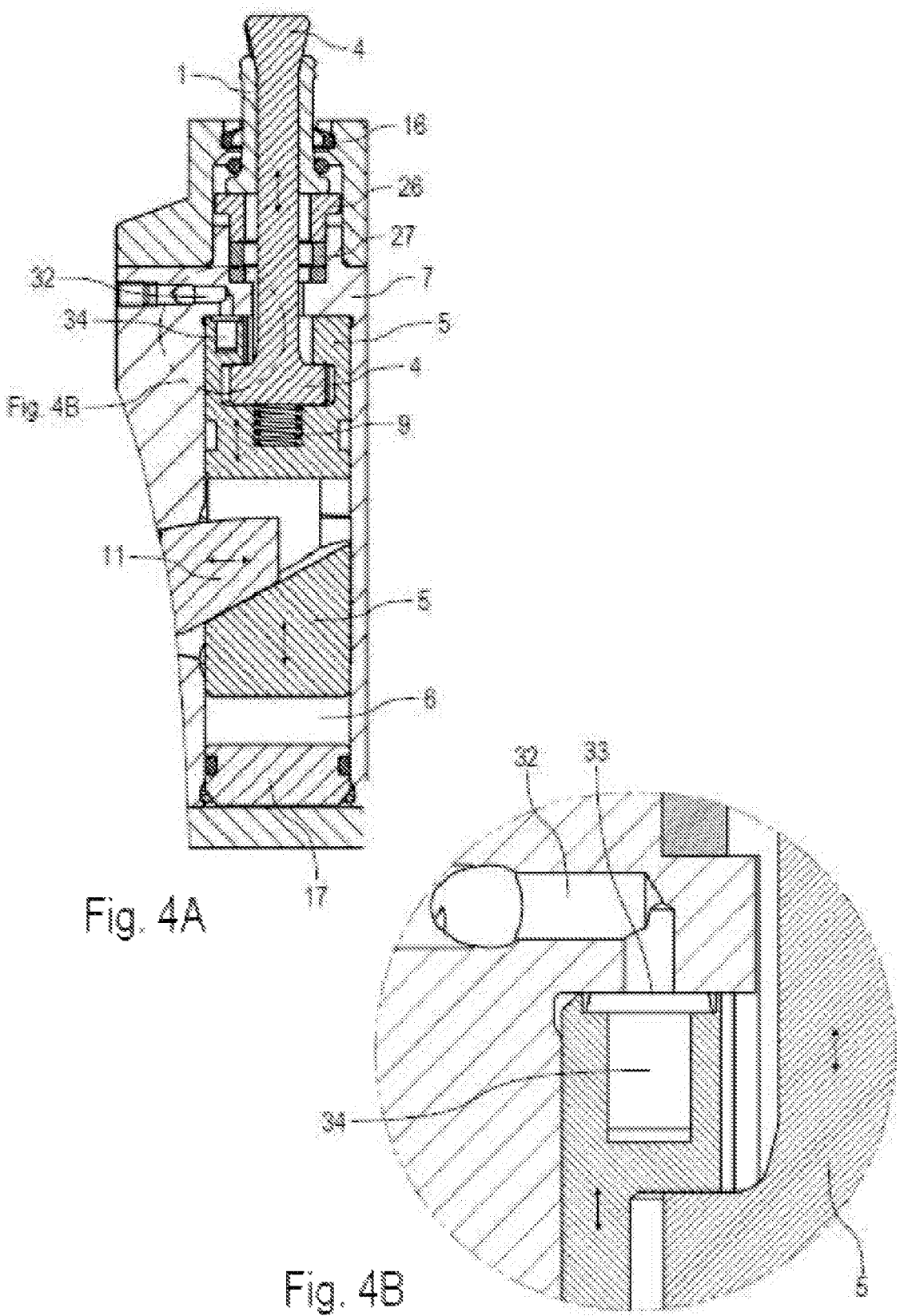
FIG. 4A a partial cross-sectional view through a bore clamp according to the invention to illustrate the pneumatic position sensing, FIG. 4B an enlarged detailed view from FIG. 4A, FIG. 5A a cross-sectional view through a bore clamp according to the invention to illustrate the pneumatic position sensing, FIG. 5B-5E an enlarged detail view of the bore clamp from FIG. 5A in different operating states, FIG. 6A a partially cut-away perspective view of a bore clamp according to the invention to illustrate the anti-rotation device, FIG. 6B the anti-rotation device of the bore clamp from FIG. 6A, FIGS. 7A and 7B a cover cap on the clamping bolt of the bore clamp according to the invention, FIGS. 8A and 8B different operating states of a bore clamp according to the invention with wedge surfaces for radial compression of the clamping bush, FIG. 9 a cross-sectional view through a bore clamp according to the invention with a radially extending spiral spring for radial compression of the clamping bush, FIGS. 10A and 10B different views of the positively guided resetting of the clamping bush by means of coupling elements, FIGS. 11A and 11B various views of the positively guided return of the clamping bush by means of a T-slot connection, and FIG. 12 a cross-sectional view through a bore clamp according to the invention with an inductive distance sensor for position sensing.

Furthermore, the pneumatic position monitoring comprises another compressed air line 32, which is shown in FIGS. 4A and 4B. Thus, the compressed air line 32 opens axially from above into the cylinder 6 for the tension bolt 5 at an opening 33. A sealing element 34 is located in the upper side of the tension bolt 5 at this point. In the unclamping position shown in FIG. 4B, the tension bolt 5 closes the opening 33 of the compressed air line 32 with the sealing element 34, which enables pneumatic monitoring. In the downward pulled clamping position, on the other hand, the tension bolt 5 releases the opening 33 of the compressed air line 32, which enables pneumatic monitoring.

FIGS. 5A-5E show another compressed air line 35 for pneumatic position monitoring. In addition, a radially extending through-hole 36 is arranged in the tension bolt 5, which extends radially and is more or less or not at all aligned with the compressed air line 35 depending on the axial position of the tension bolt 5, which enables pneumatic position monitoring.

Thus, FIG. 5B shows the tension bolt 5 in its upper unclamping position. In this unclamping position, the compressed air line 35 is aligned with the through hole 36 in the tension bolt 5.

FIG. 5C, on the other hand, shows the tension bolt 5 at the beginning of the tensioning range, whereby the through hole 36 in the tension bolt 5 is then not aligned with the compressed air line 35. In this state, the compressed air line 35 is therefore closed off by the lateral surface of the tension bolt 5.

FIG. 5D, on the other hand, shows the end of the tensioning area when the tension bolt 5 has already been pulled far down, but still closes the opening of the compressed air line 35 with its lateral surface.

Finally, FIG. 5E shows the tensioned state of the tension bolt 5 when the tension bolt 5 is at the bottom. In this state, the tension bolt 5 releases the opening of the compressed air line 35, allowing pneumatic monitoring.

Figure 7A:
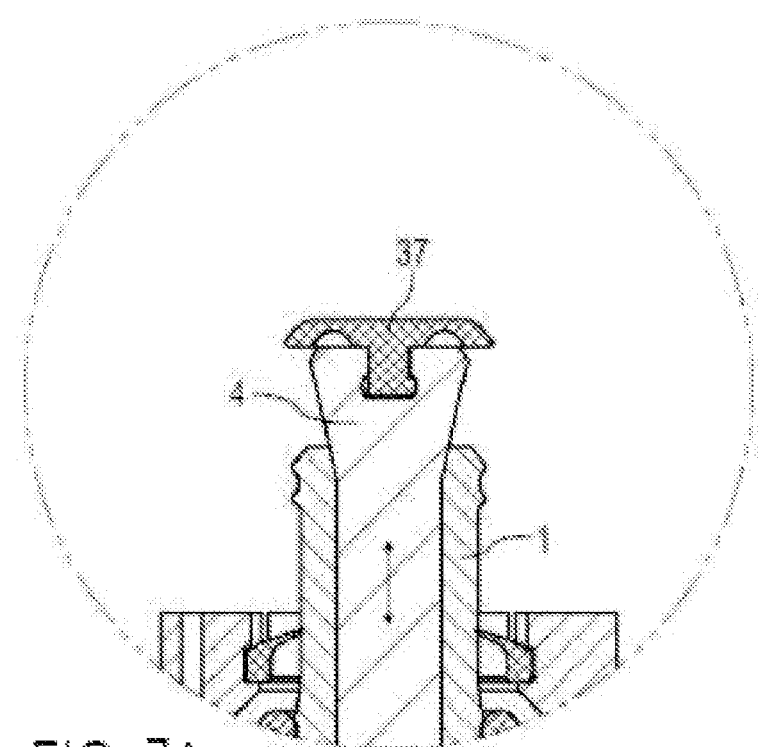
Figure 7B:
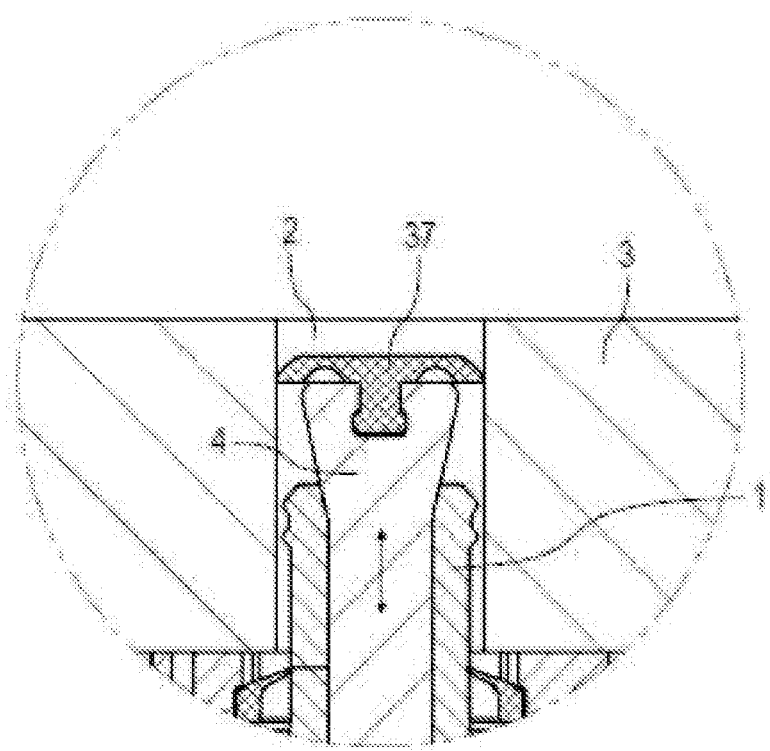

FIGS. 7A and 7B also show an elastic cover cap 37 that is removably attached to the free end of the clamping bolt 4. The cover cap 37 is elastic and plate-shaped and, in the condition shown in FIG. 7B, closes the cross-section of the workpiece bore 2, preventing foreign bodies from entering the expanded clamping bush 1 from above downward.

Figure 8A:
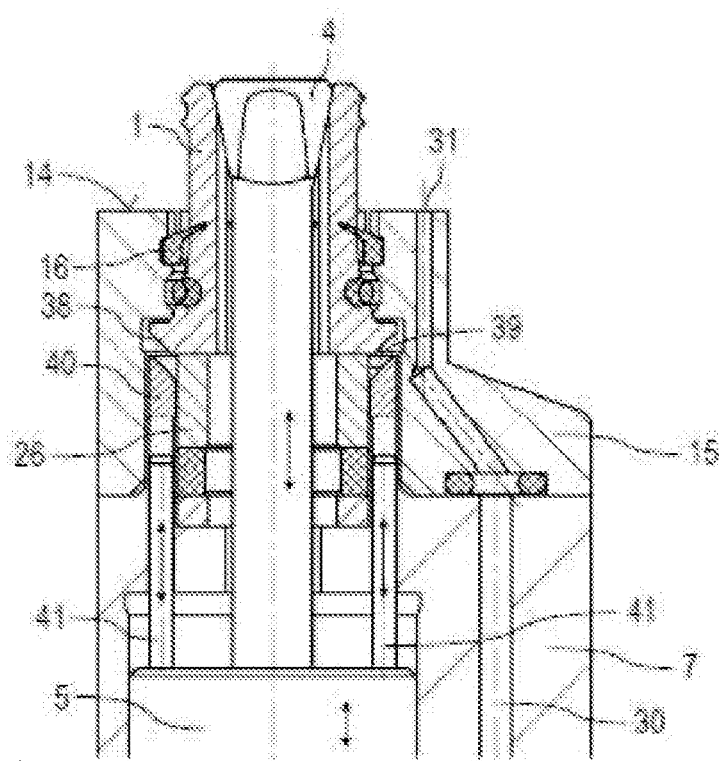
Figure 8B:
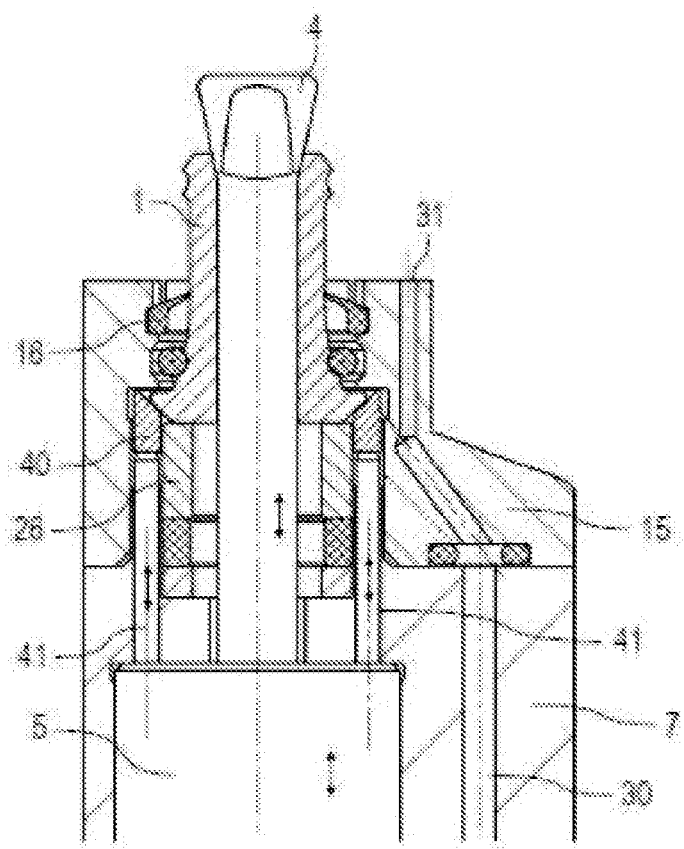

FIGS. 8A and 8B show a variant of the bore clamp according to the invention described above, so that in order to avoid repetition, reference is made to the above description, the same reference signs being used for corresponding details.

In this variant, the bore clamp has a reset device for radially compressing the clamping bush 1 again after radial expansion in the clamping position when the bore clamp is again in the unclamping position.

For this purpose, the clamping bush 1 has an annular wedge surface 38 on its underside, which presses from above onto a corresponding wedge surface 39 located in the upper side of a wedge ring 40. Due to the sliding on each other of the wedge surfaces 38, 39, the clamping bush 1 is thus radially compressed when the wedge ring 40 moves upwards.

Figure 9:
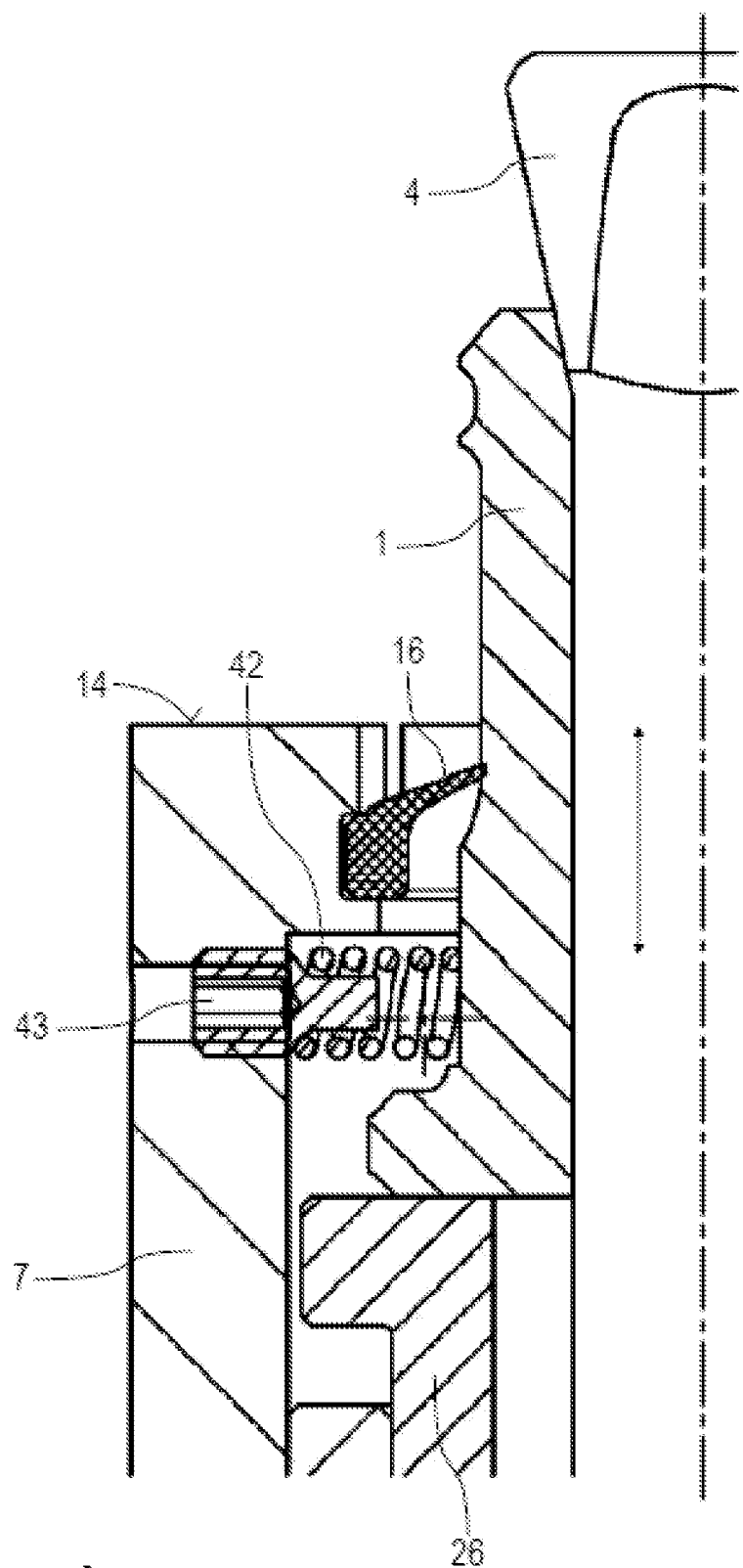

For this purpose, axially extending plungers 41 are provided, which are pressed upwards by the tension bolt 5 when the tension bolt 5 moves upwards from the clamping position into the unclamping position. FIG. 9 shows another possible design of such a return device for radial compression of the clamping bush 1.

For this purpose, the reset device in this embodiment has a spiral spring 42, which is supported on the inside of the housing 7 of the bore clamp and presses radially inwards on the clamping bush 1. The restoring force can be adjusted here by an adjusting screw 43.

Figure 10A:
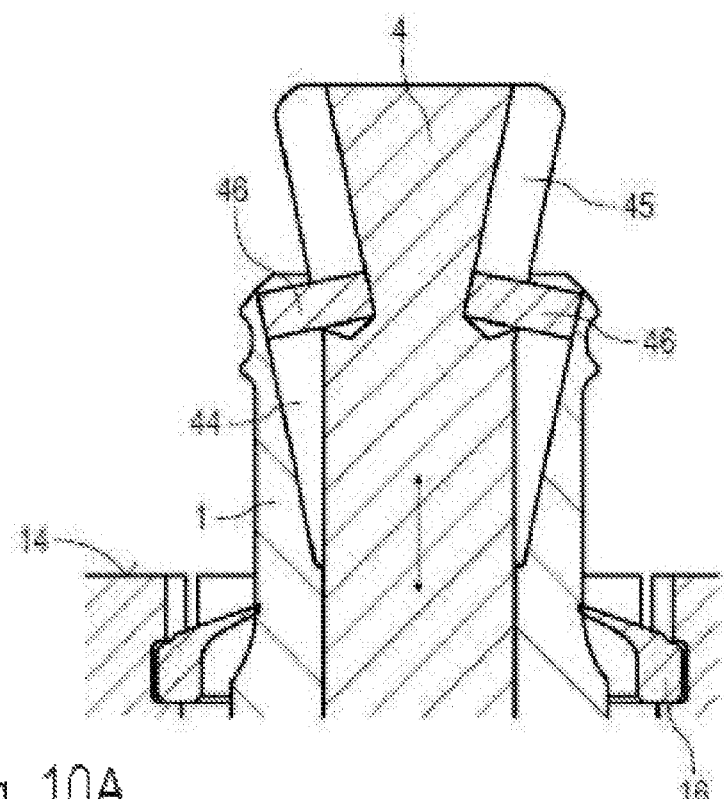
Figure 10B:
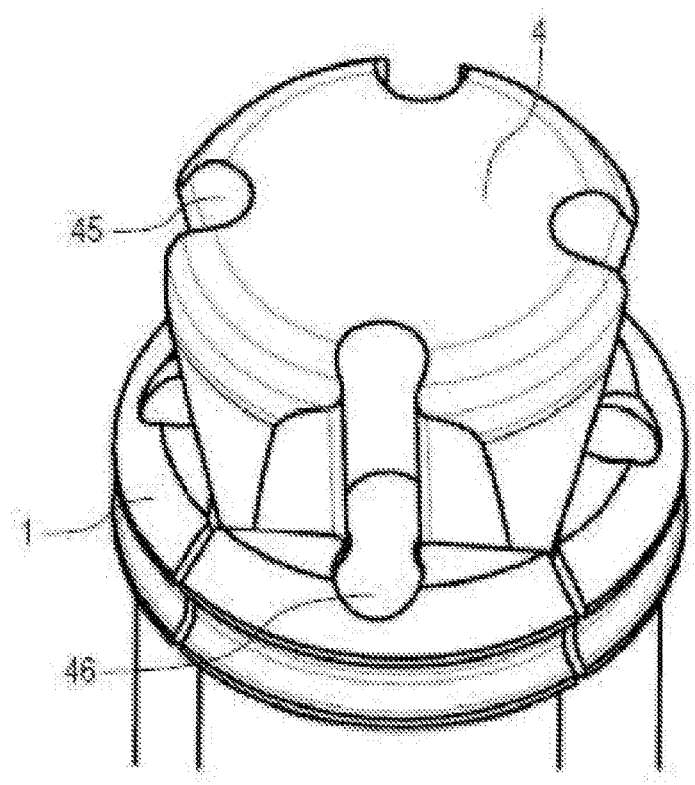

FIGS. 10A and 10B show another possible design for a restoring device for radial compression of the clamping bush 1.

For this purpose, the clamping bush 1 has grooves 44 running in the axial direction, which run in alignment over corresponding grooves 45 in the lateral surface of the clamping bolt 4. Rod-shaped coupling elements 46 slide in the grooves 44, 45, whereby the coupling elements 46 are anchored in the undercuts of the grooves 44, 45 and therefore cannot slide out of the grooves 44, 45. In this way, the coupling elements 46 effect a radial forced guidance of the clamping bush 1 relative to the clamping bolt 4, with the result that the clamping bush 1 is automatically radially compressed when the clamping bolt 4 moves from its clamping position into the unclamping position.

Figure 11A:
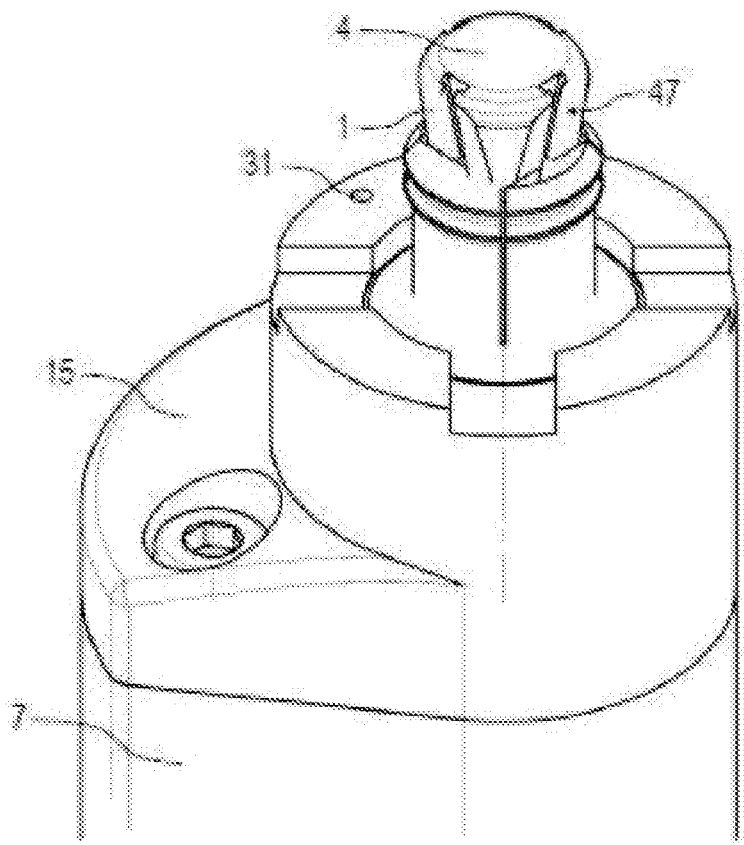
Figure 11B:
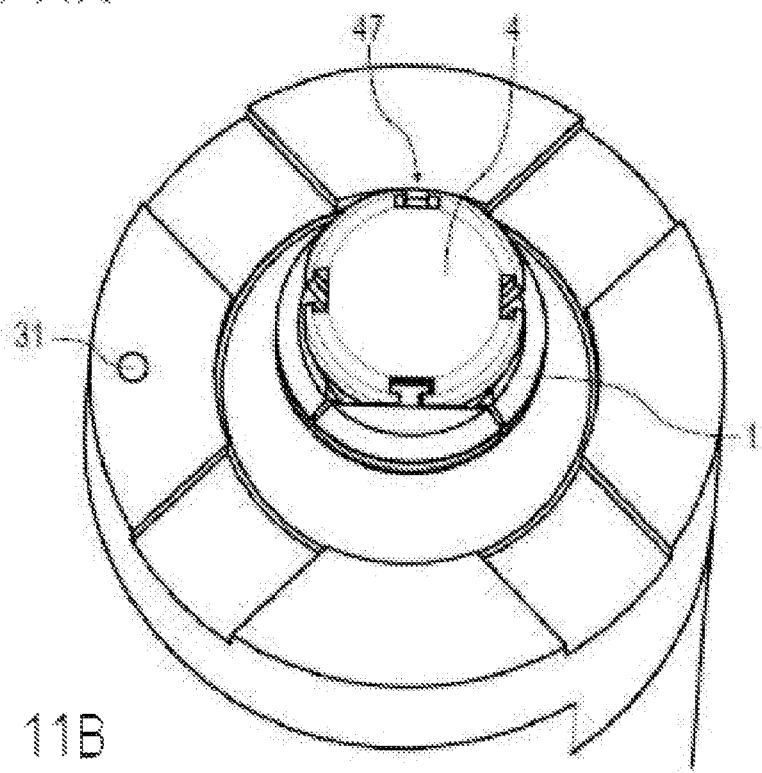

FIGS. 11A and 11B show another possible embodiment of a reset device for radial compression of the clamping bush 1 in the relaxed position. For this purpose, a T-slot connection 47 is provided between the clamping segments of the clamping bush 1 on the one hand and the clamping bolt 4 on the other hand, whereby the T-slot connection 47 also effects a forced guidance.

Figure 12:
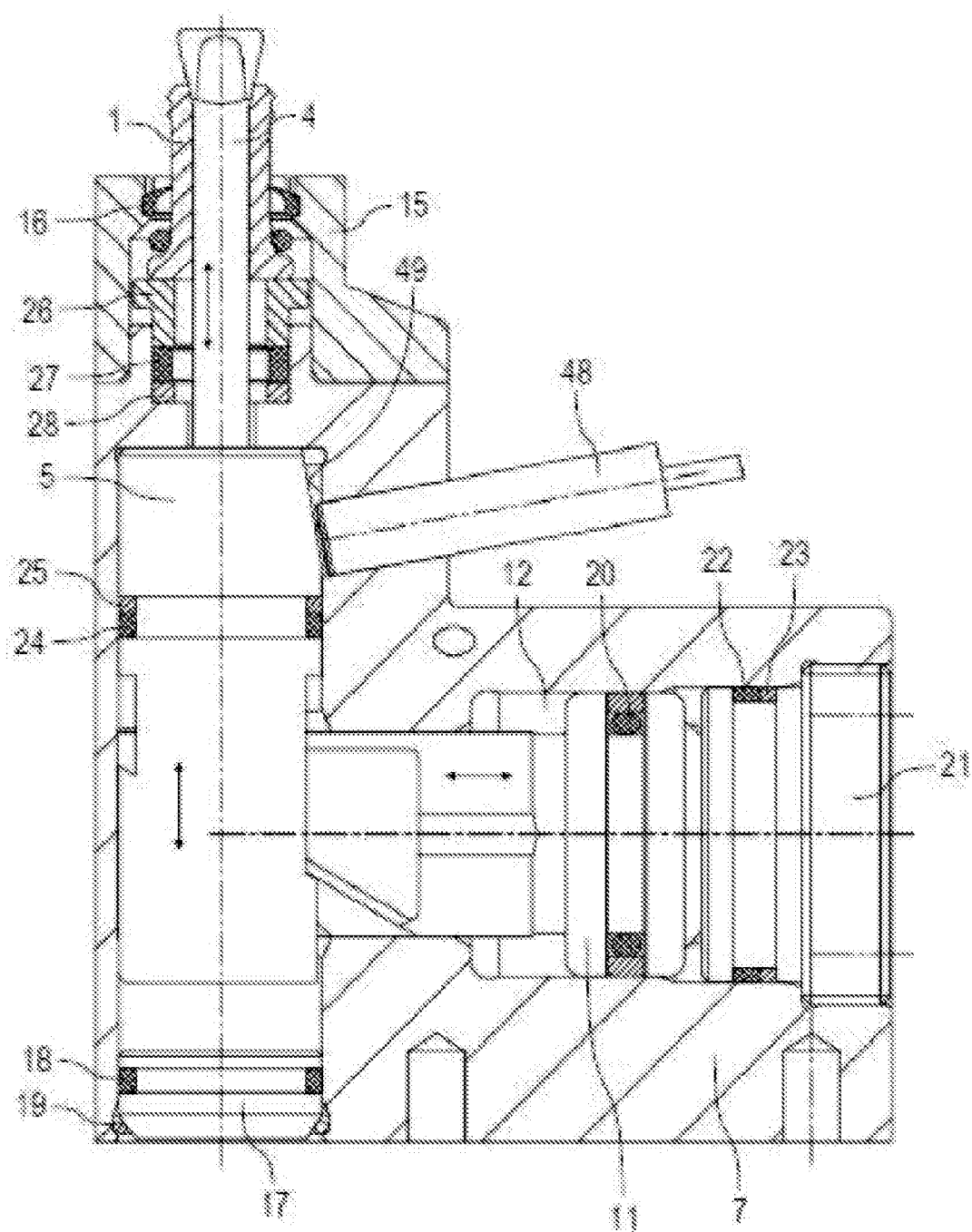

Finally, FIG. 12 shows a cross-sectional view of a modified embodiment of a bore clamp according to the invention with an inductive distance sensor 48, which is arranged laterally and measures the distance to a chamfer 49 on the tension bolt 5. The lateral distance between the inductive distance sensor 48 on the one hand and the chamfer 49 on the tension bolt 5 on the other hand is then a measure of the axial position of the tension bolt 5 along the clamping direction.

The invention is not limited to the preferred embodiments described above. Rather, a large number of variants and modifications are possible which also make use of the idea of the invention and therefore fall within the scope of protection. In particular, the invention also claims protection for the subject matter and the features of the dependent claims independently of the features of the main claim and also independently of the other features of the respective claims referred to.

For example, the invention also claims independent protection for the above-mentioned cover cap and a clamping bolt with such a cover cap independently of the other aspects of the invention.

In addition, the invention also claims independent protection for the idea according to the invention of the above-mentioned anti-rotation device for the tension bolt independently of the other aspects of the invention.

The various variants of the reset device for compressing the clamping bush in the radial direction described above also enjoy independent protection independently of the other aspects of the invention.

Furthermore, the oil bath lubrication of the wedge gear and the friction-reducing coating of the wedge surfaces also enjoy independent protection independent of the other aspects of the invention.

Finally, the pneumatic position sensing and the electrical position sensing may also enjoy independent protection independent of the other aspects of the invention.

LIST OF REFERENCE SIGNS

1 Clamping bush
2 Workpiece bore
3 Workpiece
4 Clamping bolt
5 Tension bolt
6 Cylinder for tension bolt
7 Housing of the bore clamp
8 Hammer-shaped head of clamping bolt
9 Compression spring
10 Wedge surface of the tension bolt
11 Piston
12 Cylinder for piston 11
13 Wedge surfaces on piston 11
14 Workpiece support
15 Workpiece support bushing
16 Sealing ring
17 Bushing
18 O-ring
19 Snap ring
20 Piston seal
21 Threaded bushing
22 O-ring
23 Support ring
24 O-ring
25 Support ring
26 Pull-down washer
27 Thrust ring
28 Anti-rotation device
29 Bars of the anti-rotation device
30 Compressed air line for pneumatic position sensing
31 Opening of the compressed air line in the workpiece support
32 Compressed air line for pneumatic position sensing
33 Opening of the compressed air line in the cylinder of the tension bolt
34 Sealing element in the tension bolt
35 Compressed air line for pneumatic position sensing
36 Radial through hole in the tension bolt
37 Cover cap on the end of the tension bolt
38 Wedge surface on the underside of the tension bushing
39 Wedge surface of the wedge ring
40 Wedge ring
41 Plunger
42 Coil spring
43 Adjustment screw for adjusting the restoring force
44 Grooves in the clamping bush
45 Grooves in the clamping bolt
46 Coupling elements
47 T-slot connection
48 Inductive distance sensor
49 Chamfer on the tension bolt

The invention claimed is:

1. A bore clamp for clamping a workpiece comprising a workpiece bore located in the workpiece, with
   a) a clamping bush for engaging in the workpiece bore, the clamping bush being radially expandable,
   b) a clamping bolt which extends coaxially through the clamping bush and is axially displaceable in a clamping direction between a clamping position and an unclamping position,
      b1) where the clamping bolt radially expands the clamping bush in the clamping position in order to clamp the clamping bush in the workpiece bore,
      b2) whereas the clamping bolt does not radially expand the clamping bush in the unclamping position so that the clamping bush can be inserted into the workpiece bore or pulled out of the workpiece bore, and
   c) a clamping bolt drive for axial displacement of the clamping bolt in the clamping direction into the clamping position, wherein the clamping bolt drive comprises the following:
      c1) a piston laterally displaceable with respect to the clamping direction, and
      c2) a wedge gear with wedge faces sliding on one another for converting the lateral movement of the piston into a corresponding axial movement of the clamping bolt in the clamping direction.

2. The bore clamp according to claim 1, wherein the clamping bolt drive drives the piston via one of the following drive types:
   a) electromotive,
   b) pneumatically,
   c) hydraulically or
   d) mechanically via a screw gear.

3. The bore clamp according to claim 1, wherein
   a) at least one of the wedge surfaces is provided with at least one of a friction-reducing and a wear-reducing coating, and
   b) the wedge surfaces are arranged in an oil bath.

4. The bore clamp according to claim 1, wherein
   a) a cover cap is mounted on a free end of the clamping bolt, and
   b) the cover cap elastically closes the cross-section of the workpiece bore and thereby prevents foreign bodies from the workpiece bore from penetrating into the clamping bush, which is expanded in the clamping position, when the workpiece bore is open at the top.

5. The bore clamp according to claim 4, wherein the cover cap is detachably mounted on the clamping bolt.

6. The bore clamp according to claim 1, wherein the clamping bolt drive comprises at least one of the following:
   a) a tension bolt which is displaced in the clamping direction by the wedge gear in a cylinder,
   b) a bayonet lock for releasable anchoring of the tension bolt in the tension bolt, and
   c) an anti-rotation device which prevents rotation of the clamping bolt relative to the tension bolt during operation.

7. The bore clamp according to claim 1, further comprising a reset device for resetting the radial expansion of the clamping bush in the clamping position into a radially contracted position of the clamping bush in the unclamping position.

8. The bore clamp according to claim 7, wherein the reset device comprises:
   a) a circumferential wedge surface on the underside of the clamping bush,
   b) a wedge ring on the underside of the clamping bush with a circumferential wedge surface on its upper side, the wedge surfaces of the wedge ring on the one hand and of the clamping bush on the other hand sliding on one another, and
   c) at least one axially extending plunger which, on the one hand, is connected to the tension bolt and, on the other hand, presses against the wedge ring, so that the wedge ring radially compresses the clamping bush in the unclamping position.

9. The bore clamp according to claim 7, wherein the reset device has at least one spring, which presses substantially radially on the clamping bush from the outside with a certain resetting force.

10. The bore clamp according to claim 9, wherein the resetting force is adjustable with an adjusting screw.

11. The bore clamp according to claim 7, wherein the reset device comprises:
    a) first grooves in a lateral surface of the clamping bolt, the first grooves extending in a longitudinal direction and each having an undercut,
    b) second grooves in an inner surface of the clamping bush, the second grooves running in a longitudinal direction and each having an undercut, and
    c) coupling elements which slide in the first grooves on the one hand and in the second grooves on the other hand, so that the coupling elements forcibly radially contract the clamping bush when the clamping bolt is moved from the clamping position to the unclamping position.

12. The bore clamp according to claim 7, wherein the reset device has a locking connection between the clamping bush and the clamping bolt, so that the positive locking connection radially contracts the clamping bush in a guided manner when the clamping bolt is moved from the clamping position into the unclamping position.

13. The bore clamp according to claim 1, further comprising a pneumatic position sensing for pneumatic detection of the clamping position and the unclamping position, wherein the pneumatic position sensing can distinguish at least two, three or four different positions.

14. The bore clamp according to claim 13, wherein the pneumatic position sensing is adapted for detection of at least one of the following positions of a tension bolt:
    a) the clamping position,
    b) the unclamping position,
    c) a position of the tension bolt within a tensioning range which permits a clamping process,
    d) a clamped position in which the tension bolt is tensioned and is outside the tensioning range.

15. The bore clamp according to claim 13, wherein the pneumatic position sensing comprises:
    a) a tension bolt,
    b) a cylinder in which the tension bolt is displaceable along the clamping direction, and
    c) a first compressed air line which opens into the cylinder substantially axially at a first opening from the workpiece side,
       c1) wherein the first opening of the first compressed air line is closed by the tension bolt in the unclamping position,
       c2) whereas the first opening of the first compressed air line is released by the tension bolt in the clamping position.

16. The bore clamp according to claim 15, wherein the pneumatic position sensing comprises:
    a) the tension bolt,
    b) the cylinder in which the tension bolt is displaceable along the clamping direction,
    c) a second compressed air line which opens substantially radially into the cylinder at a second opening, and
    d) a radial bore in the tension bolt,
       d1) whereas the radial bore of the tension bolt is aligned with the second opening of the second compressed air line in the unclamping position,
       d2) whereas the second opening of the second compressed air line is closed by the lateral surface of the tension bolt when the tension bolt is located along the tensioning direction within a tensioning range which permits a clamping process,
       d3) while the second opening of the second compressed air line is released from the tension bolt when the tension bolt is tensioned through and is thus outside the tensioning range.

17. The bore clamp according to claim 1, further comprising an electrical position sensing device for sensing the position of the tension bolt.

18. The bore clamp according to claim 17, wherein the electrical position sensing device is adapted for detecting at least one of the following positions of the tension bolt:
    a) the clamping position,
    b) the tension unclamping position,
    c) a position of the tension bolt within a tensioning range which permits a clamping process, and d) a clamped position in which the tension bolt is tensioned and is outside the tensioning range.

19. The bore clamp according to claim 17, wherein
a) the electrical position sensing determines the axial position of the tension bolt along the clamping direction as a quantitative variable, and
b) the electrical position sensing calculates a diameter of the clamping bush from the axial position of the tension bolt.

20. The bore clamp according to claim 17, wherein
a) the bore clamp has a force sensor which measures the tensioning force acting on the tension bolt during a clamping process,
b) the clamping force acting on the tension bolt shows an increase in force when the clamping bush, during its radial expansion, strikes against an inner wall of the workpiece bore,
c) the bore clamp determines the axial position of the tension bolt at the time of the increase in force,
d) the bore clamp determines the axial position of the tension bolt in the clamping position, and
e) the bore clamp determines the radial penetration depth with which the clamping bush penetrates in radial direction into the inner wall of the workpiece bore from
   e1) the axial position of the tension bolt at the time of the force increase and
   e2) the axial position of the tension bolt in the clamping position.

21. The bore clamp according to claim 17, wherein the electrical position sensor has the following:
a) a bevel on the tension bolt, and
b) a distance sensor, which is mounted laterally next to the tension bolt and measures the lateral distance to the slope of the tension bolt, the lateral distance between the distance sensor and the slope of the tension bolt being a measure of the axial position of the tension bolt along the tensioning direction.

22. The bore clamp according to claim 21, wherein the distance sensor is an inductive sensor.

23. A bore clamp for clamping a workpiece comprising a workpiece bore located in the workpiece, with
a) a clamping bush for engaging in the workpiece bore, the clamping bush being radially expandable,
b) a clamping bolt which extends coaxially through the clamping bush and is axially displaceable in a clamping direction between a clamping position and an unclamping position,
   b1) where the clamping bolt radially expands the clamping bush in the clamping position in order to clamp the clamping bush in the workpiece bore,
   b2) whereas the clamping bolt does not radially expand the clamping bush in the unclamping position so that the clamping bush can be inserted into the workpiece bore or pulled out of the workpiece bore, and
c) a clamping bolt drive for axial displacement of the clamping bolt in the clamping direction into the clamping position, said clamping bolt drive comprises the following:
   c1) a piston laterally displaceable with respect to the clamping direction, and
   c2) a wedge gear with wedge faces sliding on one another for converting the lateral movement of the piston into a corresponding axial movement of the clamping bolt in the clamping direction.,
   c3) a tension bolt which is displaced in the clamping direction by the wedge gear in a cylinder, and
   c4) an anti-rotation device which prevents rotation of the clamping bolt relative to the tension bolt during operation.

24. A bore clamp for clamping a workpiece comprising a workpiece bore located in the workpiece, with
a) a clamping bush for engaging in the workpiece bore, the clamping bush being radially expandable,
b) a clamping bolt which extends coaxially through the clamping bush and is axially displaceable in a clamping direction between a clamping position and an unclamping position,
   b1) where the clamping bolt radially expands the clamping bush in the clamping position in order to clamp the clamping bush in the workpiece bore,
   b2) whereas the clamping bolt does not radially expand the clamping bush in the unclamping position so that the clamping bush can be inserted into the workpiece bore or pulled out of the workpiece bore,
c) a clamping bolt drive for axial displacement of the clamping bolt in the clamping direction into the clamping position, and
d) a reset device for resetting the radial expansion of the clamping bush in the clamping position into a radially contracted position of the clamping bush in the unclamping position, wherein the reset device comprises:
e) a circumferential wedge surface on the underside of the clamping bush,
f) wedge ring on the underside of the clamping bush with a circumferential wedge surface on its upper side, the wedge surfaces of the wedge ring on the one hand and of the clamping bush on the other hand sliding on one another, and
g) at least one axially extending plunger which, on the one hand, is connected to a tension bolt and, on the other hand, presses against the wedge ring, so that the wedge ring radially compresses the clamping bush in the unclamping position.

25. The bore clamp according to claim 24, wherein the reset device has at least one spring, which presses substantially radially on the clamping bush from the outside with a certain resetting force, the resetting force being adjustable with an adjusting screw.

26. The bore clamp according to claim 24, wherein the reset device has a positive locking connection between the clamping bush and the clamping bolt, so that the locking connection radially contracts the clamping bush in a guided manner when the clamping bolt is moved from the clamping position into the unclamping position.

27. A bore clamp for clamping a workpiece comprising a workpiece bore located in the workpiece, with
a) a clamping bush for engaging in the workpiece bore, the clamping bush being radially expandable, preferably with several separate clamping segments which are arranged distributed over the circumference of the clamping bush,
b) a clamping bolt which extends coaxially through the clamping bush and is axially displaceable in a clamping direct between a clamping position and an unclamping position,
   b1) where the clamping bolt radially expands the clamping bush in the clamping position in order to clamp the clamping bush in the workpiece bore,
   b2) whereas the clamping bolt does not radially expand the clamping bus in the unclamping position so that the clamping bush can be inserted into the workpiece bore or pulled out of the workpiece bore, c) a clamping bolt drive for axial displacement of the clamping bolt in the clamping direction into the clamping position, and
d) a reset device for resetting the radial expansion of the clamping bush in the clamping position into a radially contracted position of the clamping bush in the unclamping position wherein the reset device comprises:
e) first grooves in a lateral surface of the clamping bolt, the first grooves extending in a longitudinal direction and each having an undercut, and
f) second grooves in an inner surface of the clamping bush, the second grooves running in a longitudinal direction and each having an undercut,
g) coupling elements which slide in the first grooves on the one hand and in the second grooves on the other hand, so that the coupling elements forcibly radially contract the clamping bush when the clamping bolt is moved from the clamping position to the unclamping position.

* * * * *